H. PIERCE.
TRACKER BOARD.
APPLICATION FILED JUNE 24, 1910.
Reissued Dec. 26, 1911.
13,345.
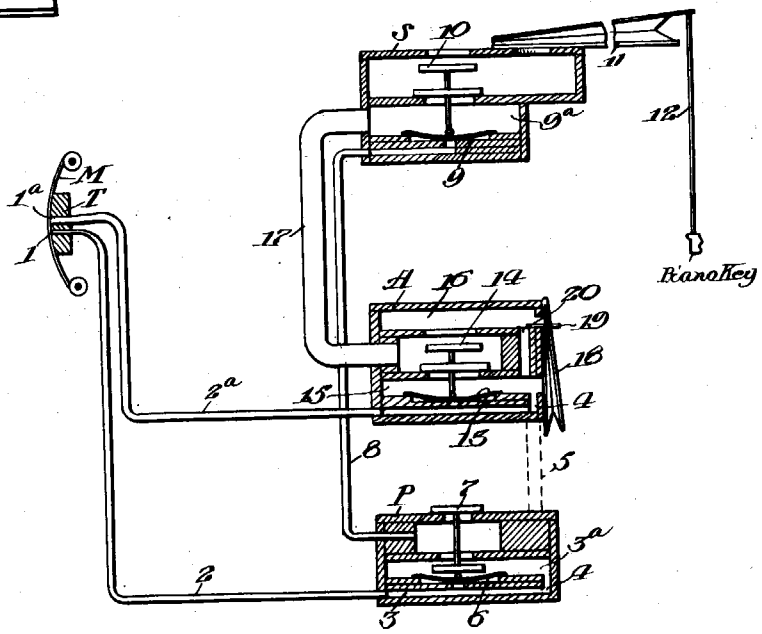
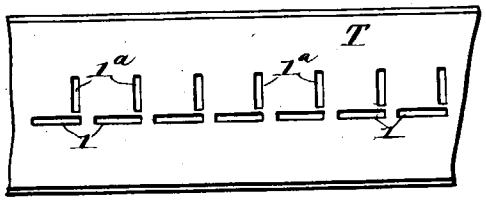
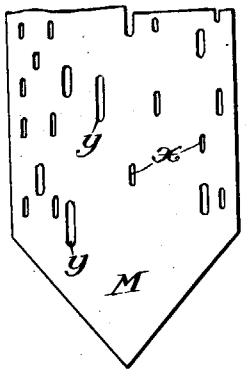
Witnesses
Geo. Wernich
A. Lyda Jones.
Inventor
Harry Pierce
by A. Miller Depew Atty
COLUMBIA PLANOGRAPH CO., WASHINGTON, D. C.

UNITED STATES PATENT OFFICE.

HARRY PIERCE, OF KANSAS CITY, MISSOURI, ASSIGNOR, BY MESNE ASSIGNMENTS, TO THE CABLE COMPANY, OF CHICAGO, ILLINOIS, A CORPORATION OF ILLINOIS.

TRACKER-BOARD.

13,345. Specification of Reissued Letters Patent. Reissued Dec. 26, 1911.

Original No. 895,392, dated August 4, 1908, Serial No. 402,716. Application for reissue filed June 24, 1910. Serial No. 568,817.

*To all whom it may concern:*

Be it known that I, HARRY PIERCE, a citizen of the United States, residing at Kansas City, in the county of Jackson and State of Missouri, have invented certain new and useful Improvements in Tracker-Boards, of which the following is a specification.

This invention relates to pneumatically actuated musical instruments of that type that are operated under the control of specially devised music sheets mounted to pass over a tracker range or board, and the present invention relates to a novel construction of tracker-board, the present case being a division of my application filed September 6th, 1907, for valve systems and tracker boards, Serial No. 391,658.

For a full understanding of the invention, reference is to be had to the following description and accompanying drawings, in which:

Figure 1 is a face view of a portion of the tracker board, constructed in accordance with my invention; Fig. 2 is a transverse sectional view in the nature of a diagram, illustrating my improved valve system above mentioned, in connection with the tracker board; and Fig. 3 is a view of a portion of the perforated music sheet designed specially for my improved tracker board.

Corresponding and like parts are referred to in the following description and indicated in all the views of the drawings by the same reference characters.

In order that the operation of my improved tracker board may be fully understood, I shall describe it in relation to the valve system which forms the basis of my former application above mentioned, and referring to the drawings, the letter T designates my improved tracker board or range, across which the perforated music roll or sheet M is arranged to pass; P designates the primary vacuum chest of the ordinary double action pneumatic player, and "S" the secondary vacuum chest thereof, arranged in accordance with the principles of this invention; and A designates the additional or auxiliary vacuum chest which renders the theme emphasizing effects possible.

The tracker board T is provided with the usual longitudinally extending or elongated ports 1, each of which is connected by a flexible tracker tube 2 with the respective vacuum chambers 3 in the primary vacuum chest P, the latter being provided with a vent 4 and connected to the pipe or tube 5 leading to the suction bellows (not shown). The chamber 3 is in communication with a diaphragm pneumatic 6 underneath the double action valve 7. A tube 8 leads from above the lower head of said valve to the secondary vacuum chest S underneath and in communication with its diaphragm 9, adapted to actuate its valve 10.

11 designates the ordinary secondary or power pneumatic of the bellows type, designed to actuate the suspended finger or rod 12 so as to depress the key.

The foregoing parts are, as thus far described, of the usual formation. In their practical operation, whenever a port or passage 1 of the tracker board is closed by a perforated music sheet, a partial vacuum exists in the tube 2 created through the vent 4, and the suction is transmitted through the chamber $3^a$, and tube 8 to the diaphragm 9. A partial vacuum also exists in the chamber $9^a$, above the diaphragm pneumatic 9. This causes the valve 10 to be so held as to admit atmospheric air into the secondary or power pneumatic 11, the valve 7 closing the chest P against the admission of atmospheric air.

Whenever the perforated music sheet M opens one of the parts 1, it destroys the equalization, causing the valve 7 to rise and admit atmospheric air into the chest P and to the tube 8. Air rushing into said tube will manifestly raise the valve 10, closing the upper valve and opening the lower valve, thereby causing the secondary or power pneumatic 11 to close, air being emptied through the chamber $9^a$, the pipe 17 connected at one end thereto, the chamber 16 and exhaust or suction pipe 5 that is connected to the pumping bellows, this exhaust being controlled by the regulator 18. Hence, a soft or unaccentuated tone will be produced, it being understood that the valve 14 is lowered during this operation, the tube $2^a$ being closed.

Referring now to Fig. 1, wherein is illustrated my improved tracker board, it will be seen that the same is provided, in addition to the usual ports 1, with a correlated series of transversely extending ports $1^a$.

The ports $1^a$ extend at right angles to the ports 1 and are set just back of the ports 1, the respective ports $1^a$ being in alinement with one end of the corresponding port 1 and being of less width than the length of said ports 1, so as to leave a portion of the several ports 1 between every two of the ports $1^a$, whereby cuttings or openings in the music sheet M may be so located as to open the ports 1 during the traverse of the sheet over the tracker range, without opening the corresponding ports $1^a$, while other cuttings or openings in the sheet are so disposed that they will open any one or more of the ports $1^a$ as the sheet travels forwardly over the rim and simultaneously open the corresponding port or ports 1 at one end of the same. A tube $2^a$ leads from each one of these ports $1^a$ to the auxiliary vacuum chest A and communicates with the diaphragm 13 underneath the double valve 14, governing chambers 15 and 16 that are designed for communication with chamber $9^a$ by means of the pipe 17.

18 designates a regulator of the well known type designed to control the tension by means of the valve 19.

In describing the operation of the additional vacuum chest of my invention in connection with the other parts, it is to be understood that the music sheet to be employed is especially formed with a set of accenting openings *y* (see Fig. 3) in addition to the ordinary cuttings *x*. So long as the ports 1 and $1^a$ in the tracker board are closed by the perforated music sheet, there is the same partial vacuum in the channels of the chest P, as before stated, to the diaphragm 9 in chest S; but the vacuum in the chamber $9^a$ is created through pipe 17 to chest A, through chamber or channel 16, through the regulator 18 or the passage 20, and through the pipe 5 to the pumping bellows. The difference in pressure between the chamber $9^a$ and the bellows 18 of the regulator is controlled by the slide valve 19, and the tension in the chamber is thus regulated. There is strong suction or high tension through the channels of the chest P from the diaphragm 9, and through the pipe 5 from chamber 15, giving the valve in the vacuum chest P positive action, although the secondary or power pneumatic 11 is under regulated tension and its dynamic action is thereby weakened or subdued to give a soft expression or tone.

Whenever the perforation in the music sheet opens a port $1^a$ in the tracker board, atmospheric pressure rushes through the tube $2^a$, destroying the equalization under the diaphragm 13, lifting the valve 14, closing the chamber 16, and opening chamber 15, thereby switching the tension from that in the chamber 16, (such tension being regulated by bellows 18) to the direct unregulated tension in the chamber 15 and creating a strong suction through the pipe 17 from the chamber $9^a$. This gives said chamber $9^a$ the same suction as under the diaphragm 6. Whenever, however, this same perforation in the music sheet extends over a port 1 in the tracker board, as well as a port $1^a$, atmospheric pressure will rush through the tube 2 into the chest P, destroying equalization under the diaphragm 6, raising the valve 7, and thereby admitting atmospheric pressure through the tube 8 so as to destroy the exhaust under the diaphragm 9. The latter being then raised, lifts the valve 10, and effects the closing of the pneumatic 11 with added force, the note thereby being accented.

It is to be particularly noted that there are two ports for every note, and that the upper port when in use is merely to assist the lower in performing its function. It is also to be understood that the upper port $1^a$ is opened by the same perforation which opens the lower port 1.

Having thus described the invention, what is claimed as new is:

1. A tracker board formed with a series of longitudinally elongated air ports and a series of transversely elongated air ports back of the air ports of the first named series, each of the transversely elongated ports being in transverse alinement with a portion of the corresponding longitudinally elongated port.

2. A tracker board formed with a series of longitudinally elongated air ports and a series of transversely elongated air ports back of the ports of the first named series, respectively, each transversely elongated port being in transverse alinement with the end portion of a corresponding longitudinally elongated port.

3. A tracker board formed with a series of longitudinally elongated air ports and a series of transversely elongated air ports back of the respective air ports of the first named series, one side wall of each of the transversely elongated ports being substantially flush with one end wall of a corresponding longitudinally elongated port and each of said transversely elongated ports being less in width than the longitudinally elongated ports are in length, as and for the purpose set forth.

4. A tracker having separate and independent passages terminating in front and rear ports, whereof the rear ports are in alinement with a portion only of the front ports.

5. A tracker having separate and independent passages terminating in front and rear ports, whereof the rear ports are transversely elongated and are in alinement with a portion of the front ports.

6. A tracker board formed with separate continuous passages terminating in a series of longitudinally elongated air ports, and a series of transversely elongated air ports back of the ports of the first named series, each of the transversely elongated ports being in transverse alinement with a portion of the corresponding longitudinally elongated port.

7. A tracker board formed with a series of longitudinally elongated air ports and a series of transversely elongated air ports back of the air ports of the first named series, each of the transversely elongated ports being in transverse alinement with a portion of the corresponding longitudinally elongated port.

8. A tracker board formed with a series of longitudinally elongated air ports and a series of transversely elongated air ports back of the ports of the first named series, respectively, each transversely elongated port being in transverse alinement with the end portion of a corresponding longitudinally elongated port.

9. A tracker board formed with a series of longitudinally elongated air ports and a series of transversely elongated air ports back of the respective air ports of the first named series, one side wall of each of the transversely elongated ports being substantially flush with one end wall of a corresponding longitudinally elongated port and each of said transversely elongated ports being less in width than the longitudinally elongated ports are in length, as and for the purpose set forth.

10. A tracker having two sets of passages extending as independent passages from the music sheet face of the tracker to another face of the tracker, and terminating in the music sheet face in front and rear ports, whereof the rear ports are in alinement with a portion only of the front ports.

In witness whereof I hereunto subscribe my name this 16th day of June, 1910.

HARRY PIERCE.

Witnesses:
G. H. SEUTENBERG,
E. R. CORBETT.

Copies of this patent may be obtained for five cents each, by addressing the "Commissioner of Patents, Washington, D. C."